March 27, 1945.  C. JOHNSON  2,372,428
MACHINE TOOL CONTROL
Filed Sept. 23, 1941  2 Sheets-Sheet 1
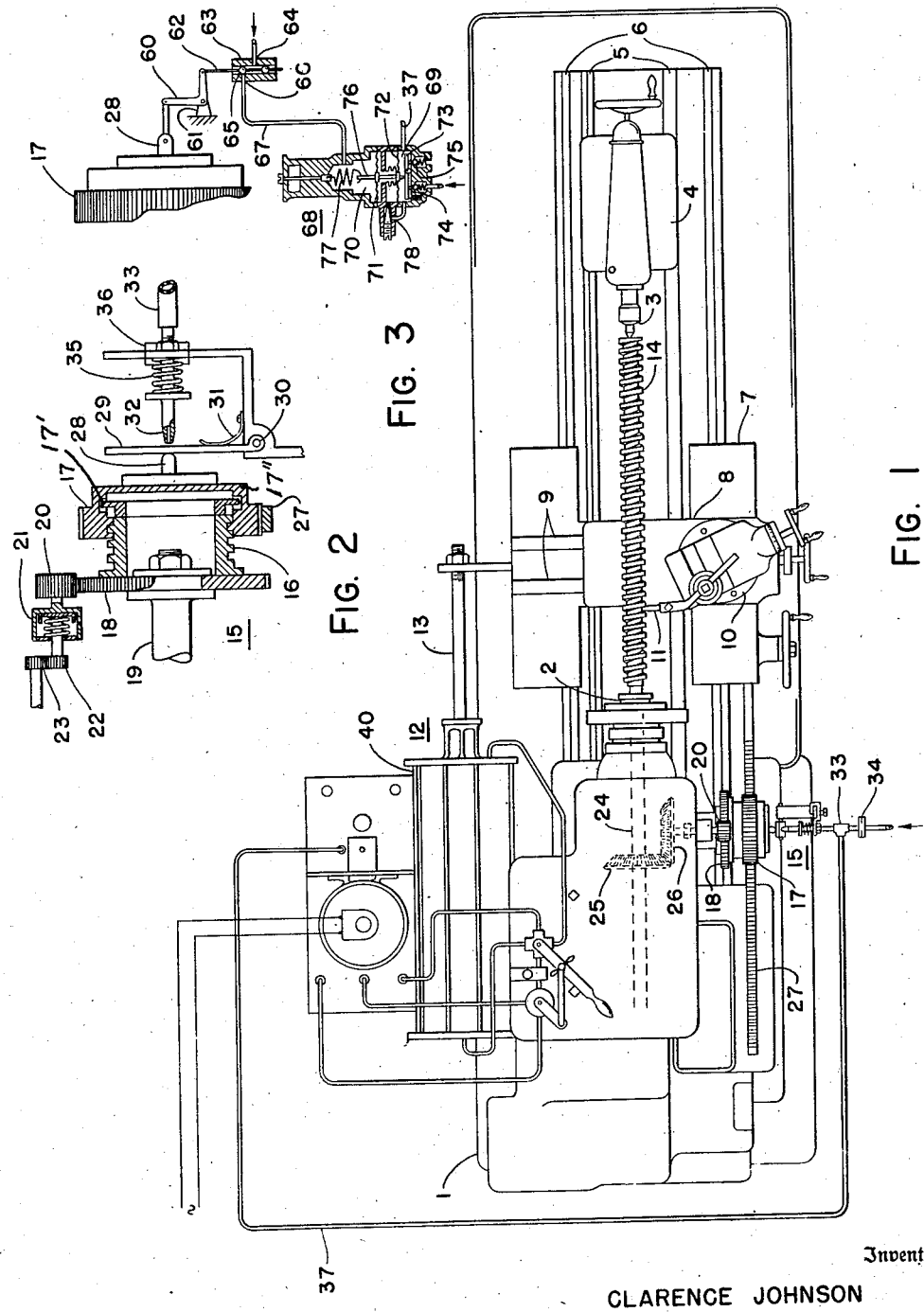
Inventor
CLARENCE JOHNSON
By Raymond D. Junkins
Attorney March 27, 1945.    C. JOHNSON    2,372,428
MACHINE TOOL CONTROL
Filed Sept. 23, 1941    2 Sheets-Sheet 2
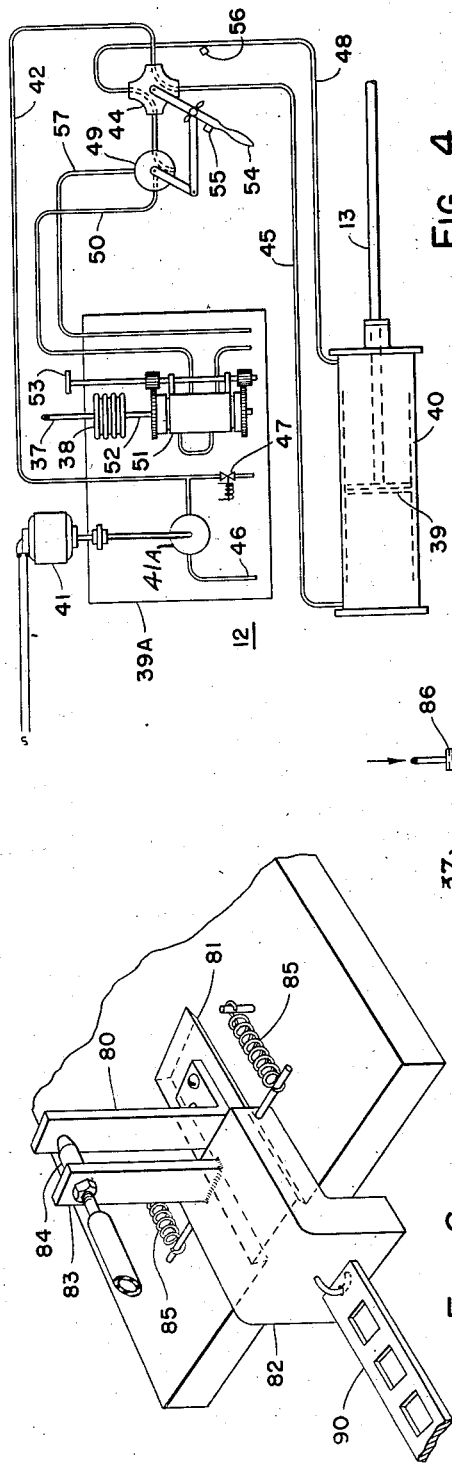
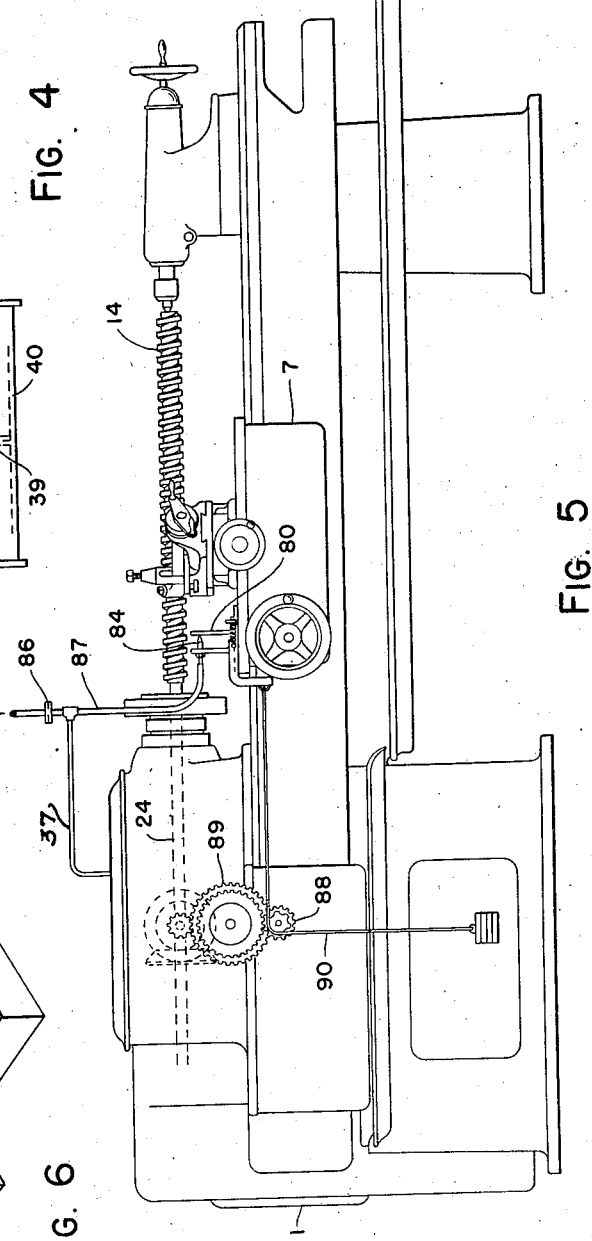
Inventor
CLARENCE JOHNSON
By Raymond W. Junkins
Attorney Patented Mar. 27, 1945

2,372,428

UNITED STATES PATENT OFFICE 2,372,428

MACHINE TOOL CONTROL

Clarence Johnson, South Euclid, Ohio, assignor to Bailey Meter Company, a corporation of Delaware Application September 23, 1941, Serial No. 412,018

6 Claims. (Cl. 82—21)

This invention relates to a control system for machine tools, and more particularly to a control system for governing the relative rate of movement between the tool and work piece of a machine tool.

One object of my invention is to provide a control system for a machine tool whereby the tool may be advanced relative to the work piece at a predetermined speed.

A further object of my invention is to provide a control system for a machine tool whereby the tool may be advanced relative to the work piece at a rate directly proportional to the speed of rotation of the work piece.

Still another object of my invention is to provide a control system for a lathe whereby the tool will be moved longitudinally along the lathe at a rate of speed directly proportional to the rate of rotation of the work piece.

A still further object of my invention is to provide a control system for a lathe whereby a thread of accurate pitch may be cut on a work piece.

Another object of my invention is to provide a control system for a lathe for advancing the tool along the work piece at a rate of speed directly proportional to the rate of rotation of the work piece without employing a lead screw or other mechanical means subject to wear.

A further object of my invention is to provide a control system for a lathe whereby accurate screw cutting may be accomplished without dependence upon a lead screw, the wear of which affects the accuracy of the operation.

Further objects will be apparent from the description and drawings, in which:

Fig. 1 is a plan view of a lathe illustrating the application of my invention thereto.

Fig. 2 is an elevation view, partially in section, of the form of pilot mechanism shown in Fig. 1.

Fig. 3 illustrates a modified form of pilot mechanism.

Fig. 4 is a diagrammatic illustration of the control circuits employed.

Fig. 5 is a plan view of an engine lathe illustrating the application of a modified form of my invention thereto.

Fig. 6 is an isometric illustration of the form of pilot mechanism employed in the embodiment of my invention illustrated in Fig. 5.

Certain features disclosed in this application are also disclosed in my copending applications, Serial Nos. 298,290, now Patent 2,259,472, issued October 21, 1941, and 384,375, filed in the United States Patent Office on October 6, 1939, and March 20, 1941, respectively, of which the instant application is a continuation-in-part.

Referring to Fig. 1, I show my invention applied to an engine lathe 1 having a head stock or live center 2 adapted to be rotated at desired speed by any suitable means (not shown) and a tail stock or dead center 3. A carriage 4 manually adjustable along the bed of the lathe in suitable ways 5 supports the tail stock or dead center 3. Also movable longitudinally along the bed of the lathe in suitable ways 6 is a carriage 7. Mounted on the carriage 7 is a cross-slide 8 movable on ways 9 transversely of the bed of the lathe.

The cross-slide 8 is provided with an adjustable tool support 10 in which is secured a tool 11. Transverse movements of the tool 11 are produced by manual adjustment. Longitudinal movements of the tool 11, that is movements of the tool parallel with the bed of the lathe 1, are produced by means of a hydraulic servomotor generally indicated at 12, which as shown is secured to the bed of the lathe and connected by means of a piston rod 13 to the carriage 7.

Supported between the head stock 2 and tail stock 3 is a work piece 14 on which, as illustrated, a machine thread is being cut. In order that the thread will have a given pitch, as well known to those familiar with the art, it is necessary that the carriage 7, and accordingly the tool 11, advance along the lathe a given amount per revolution of the work piece. In the ordinary lathe such advancement is obtained by gearing the carriage, but means of a lead screw, to the driving shaft of the head stock. Such an arrangement imposes a heavy load on the lead screw however, which after a period of time wears so that the threads are no longer accurately formed. By my invention the carriage 7 is advanced at a speed necessary to give the thread on the work piece a desired pitch without a direct mechanical connection to the driving shaft of the head stock and without employing a lead screw or other means subject to wear. In distinction to the ordinary means I employ a pilot mechanism, one form of which is generally indicated at 15 in Fig. 1, and shown to larger size in Fig. 2, whereby I establish a pneumatic loading pressure for controlling the rate of movement of the carriage 7. The loading pressure so established varies from a predetermined value, which for convenience I call the normal value, in accordance with the departure of the rate of movement of the carriage 7 from that desired, and such variations are effective to restore the rate of movement of the carriage 7 to that desired. In other words, it may be said that so long as the carriage 7 moves at the desired speed the loading pressure remains at the normal value, but upon the slightest departure from the desired speed a corresponding change in the loading pressure occurs, effective for restoring the speed of the carriage to that desired.

The pilot mechanism 15 includes differential gears 16 and 17 and wherein the internally threaded gear 17 engages the external thread on gear 16. The gear 16 is secured to a spur gear 18 journaled on a shaft 19 secured to the bed of the lathe. The spur gear 18 meshes with a pinion 20 driven through a slip clutch 21 by change gears 22 and 23, the latter of which is driven from the drive shaft 24 of the head stock 2 through bevel gears 25 and 26. The outer end of differential gear 16 terminates in an annular flange 16' extending into the groove 17' formed in the hub of differential gear 17. It will thus be evident that the differential gear 16 will be rotated at a rate of speed proportional to the rate of rotation of the drive shaft 24. The particular ratio between the speed of the differential gear 16 and drive shaft 24 may be varied by changing the ratio between the change gears 22 and 23 so that any desired number of revolutions of the differential gear 16 may be obtained per revolution of the drive shaft 24.

Normally the differential gear 16 is driven by the drive shaft 24 through the slip clutch 21. However, as will be pointed out more in detail hereinafter, if an extreme of operation is reached the differential gear 16 may remain stationary while the drive shaft 24 rotates by virtue of the slip clutch 21, thus preventing damage to the parts of the lathe which might otherwise result.

The differential gear 17 meshes with a rack 27 fastened to the carriage 7. As the carriage 7 advances along the lathe the gear 17 will be rotated at a proportional speed. Formed integral with the end surface 17" of differential gear 17 is a projection 28 engaging a baffle 29 pivotally mounted on a support 30 secured to the bed of the lathe 1 and urged against the projection 28 by a leaf spring 31.

When the differential gears 16 and 17 rotate at the same speed it is evident that the flange 16' remains intermediate the side walls of groove 17' and the projection 28 will not move in an axial direction, and the baffle 29 will remain stationary. If, however, the differential gear 16 rotates at a higher speed than the gear 17, then their relative positions are changed and the projection 28 will move axially in one direction, causing the baffle 29 to be angularly positioned about its pivot support. Conversely, if the differential gear 16 rotates at a slower speed than the gear 17, then the projection 28 will move axially in the opposite direction, causing the baffle 29 to be angularly positioned in the opposite direction. It will be observed that the width of the rack bar 27 is such that it will always be in engagement with the gear 17 notwithstanding any transverse movement that may take place therein.

Also secured to the support 30 is a nozzle 32 connected by means of a pipe 33 to a suitable source (not shown) of fluid under pressure, such as compressed air. Disposed between the source and the pipe 33 is an orifice or other similar restriction 34. The nozzle 32 continuously discharges pressure fluid to the atmosphere in the form of a jet against the baffle 29. When the baffle 29 is in the position shown, by virtue of the orifice 34, the pressure within the pipe 33 will have a predetermined value, which for convenience as heretofore stated I call the "normal value." Upon the baffle 29 approaching the nozzle 32 however, the rate of discharge therefrom will decrease, causing an increase in pressure within the pipe 33. Conversely upon the baffle 29 receding from the nozzle 32 the rate of discharge therefrom will increase, causing a decrease in pressure within pipe 33. As will be evident as the description proceeds, so long as the carriage 7 moves at the desired speed the baffle 29 will be in the position shown in Fig. 2, and the pressure will exist within the pipe 33 at the normal value. However, upon the carriage 7 increasing or decreasing from the desired rate of advancement the baffle 29 will approach or recede from the nozzle 32, causing a corresponding change in pressure within the pipe 33. Such deviation in pressure within the pipe 33 from the normal value is effective for controlling the servo-motor 12 to restore the rate of movement of the carriage 7 to that desired.

To prevent injury to the nozzle 32 and/or baffle 29, upon a material departure in the rate of movement of the carriage 7 from that desired, causing the baffle 29 to engage the nozzle 32, I show the nozzle 32 yieldably urged toward the baffle 29 by means of a compression spring 35. Normally the spring 35 holds a stop 36, secured to the nozzle 32, against the support 30. However, upon the baffle 29 engaging the tip of the nozzle 32 the spring 35 will permit lateral movement, thereby preventing injury to the nozzle.

Pipe 33 is connected by way of a pipe 37 to an expansible bellows 38 shown in Fig. 4. The variations in pressure within pipe 37 caused by the approach and recession of baffle 29 toward and away from the nozzle 32 control the rate of movement of a piston 39 in a cylinder 40, which piston moves the carriage 7. As illustrated, the control mechanism employed, whereby variations in pressure within the pipe 37 control the rate of movement of piston 39, and accordingly of the carriage 7, are conveniently mounted as a unit adjacent the cylinder 40. In my earlier filed copending applications, to which reference has previously been made, I disclose in detail the mechanism illustrated in Fig. 4 as comprising the servo-motor 12. Essentially the servo-motor comprises a reservoir 39A which normally is partially filled with a hydraulic fluid, such as a suitable oil. Housed within the reservoir 39A is a pump 41A driven by a motor 41 and which is connected through a pipe 42, 4-way valve 44 and pipe 45 to one end of the cylinder 40. The pump 41A draws oil from the reservoir 39A through a suitable inlet pipe 46 and there may be connected to the discharge pipe 42 a relief valve 47 for maintaining a predetermined pressure within the pipe 42. The opposite end of the cylinder 40 is connected by a pipe 48, 4-way valve 44, 3-way valve 49, pipe 50 and fluid resistance 51 to the oil reservoir 39A. With the 4-way valve 44 and 3-way valve 49 in the position shown, it is evident that high pressure will exist on one side of the piston 39 whereas a pressure determined by the resistance 51 will exist on the opposite side of the piston. The relation between the pressures on opposite sides of the piston 39, when the 4-way valve 44 and 3-way valve 49 are in the position shown, is such that the piston 39 is moved to the right as viewed in Fig. 4, causing the carriage 7, and accordingly the tool 11, to be positioned longitudinally along the lathe. The speed with which the carriage 7 is positioned is varied by varying the resistance of the fluid resistance 51.

The resistance 51 comprises essentially a ported body and a movable cooperating member 52 secured to the movable head of the expansible bellows 38. When the bellows 38 is in one position the resistance to the passage of hydraulic fluid is at a minimum, and as the bellows 38 is expanded, due to increases in pressure, the resistance to the passage of hydraulic fluid increases proportionately. A suitable adjusting means, such as indicated at 53, may be provided so that the resistance to fluid flow produced by the resistance 51 when the bellows 38 is at an extreme expanded condition may be brought to a predetermined value.

When some minimum pressure exists within the pipe 37 so that the bellows 38 is contracted to an extreme position, the resistance to the passage of fluid through the resistance 51 will be at a minimum, and accordingly the piston 39 and carriage 37 will be driven to the right at maximum speed. As the bellows 38 expands from this extreme contracted position, the fluid resistance will gradually increase, so that when the bellows 38 is at an extremely expanded position the piston 39 and carriage 7 will remain substantially stationary. Preferably the normal value of the pressure, that is the pressure existing within pipe 37 when normal distance exists between the nozzle 32 and baffle 29 is approximately midway between the minimum and maximum pressures effecting maximum and minimum speeds of the piston 39 respectively. Thus it will be seen that the piston 39 will be driven to the right, as shown in Fig. 4, at a speed corresponding to the pressure within the pipe 37, which in turn will vary, depending upon the distance existing between the baffle 29 and nozzle 32. So long as normal distance exists between baffle 29 and nozzle 32, indicating that the carriage 7 is being moved at the proper speed, the fluid will pass through the resistance 51 at a constant and definite rate. Upon a movement of the baffle 29 toward or away from the nozzle 32, however, a proportionate change in pressure within the pipe 37 and bellows 38 will occur, causing the piston 39 to increase or decrease in speed until normal distance is restored between the baffle 29 and nozzle 32, indicating that the carriage 7 is again proceeding at the proper speed.

In order that the tool 11 may be returned to the left end of its travel, I provide a hand operable lever 54 for simultaneously operating the 4-way valve 44 and the 3-way valve 49. Thus upon the tool 11 reaching the right end of its travel the tool 11 is withdrawn from the work piece and the rack 27 disengaged from the differential gear 17 by any suitable means (not shown). The operator will then shift lever 54 from stop 55 to a stop 56. Such shifting of lever 54 connects pipe 42 through 4-way valve 44 to pipe 48 and pipe 45 through 4-way valve 44 and 3-way valve 49 to a pipe 57 discharging into the reservoir 39A. With the lever 54 in the shifted position the piston 39, and accordingly the carriage 7, will be positioned to the left as shown in Fig. 1 at maximum speed. Upon the tool reaching the extreme left position, it will again be brought into engagement with the work piece and the rack 27 brought into mesh with the differential gear 17, and another cutting stroke started by shifting the lever 54 back to stop 55.

In Fig. 3 I show a modified form of pilot mechanism which may be employed in place of the pilot mechanism shown in Fig. 2. Referring to Fig. 3, I show the projection 28 pivotally connected to a bell crank 60. As the projection 28 is moved inwardly or outwardly by virtue of changes in speed of the carriage 7 relative to the drive shaft 24 the bell crank 60 is oscillated about a fixed support 61. Pivotally connected to the bell crank 60 is a movable valve member 62 of a pilot valve 63. The pilot valve is supplied with a suitable fluid under pressure, such as compressed air, through an inlet port 64, and which is continuously discharged to the atmosphere at either end of the pilot valve. The movable valve member 62 is provided with a restriction 65 normally positioned adjacent an outlet port 66. A pressure gradient is established across the restriction 65 and the pressure existing at the outlet port 66 will depend upon the position of the restriction 65 relative to the outlet port. In general, it may be said that the pilot valve 63 establishes a loading pressure at the outlet port 66 corresponding to the position of the movable valve member 62, and accordingly to the position of the projection 28.

The loading pressure established at the outlet port 66 is transmitted through a pipe 67 to a standardizing relay 68 of the type illustrated and described in United States Patent No. Re. 21,804 dated May 20, 1941, to Harvard H. Gorrie.

The standardizing relay 68 acts to establish within a control chamber 69 changes in pressure corresponding to changes in pressure within a loading chamber 70 to which the pipe 67 is connected, and also to continuously vary the pressure within control chamber 69 whenever the pressure within the loading chamber 70 is other than a predetermined fixed value. By proper adjustment of the standardizing relay 68 the said predetermined pressure may be made that established by the pilot valve 63 when the carriage 7 is moving along the lathe 1 at the desired rate or in the desired ratio to the rate of rotation of the work piece 14. Upon an increase or decrease in speed of the carriage 7 the loading pressure established by the pilot 63 will increase or decrease proportionately. The relay 68 will then act to establish an immediate and proportionate change in pressure within the control chamber 69, and thereafter a slow continuing change until the pressure within the loading chamber 70 is restored to the predetermined value.

The relay 68 is essentially a pressure balancing device and comprises two pair of pressure sensitive chambers separated by diaphragms 71 and 72. Within the chamber 69 is a fulcrum lever 73 adapted when tilted in one direction from the horizontal position to actuate a fluid pressure supply valve 74 (connected to any suitable source of pressure fluid not shown) to admit fluid pressure to the chamber 69, and when tilted in opposite direction to actuate an atmospheric exhaust valve 75 to discharge pressure fluid therefrom. The diaphragms 71 and 72 are connected together for simultaneous movement by a member 76 secured at its upper end to a manually adjustable loading spring 77 and arranged when moved downwardly from the position shown to cause the supply valve 74 to open, and when moved upwardly to cause the exhaust valve 75 to open. The chambers separated by the diaphragm 72 are in communication through an adjustable bleed valve 78. Assuming for example that normal pressure exists within chamber 70, then equal pressures will exist within the chambers separated by the diaphragm 72. Upon an increase in pressure within the chamber 70 the movable member 76 will move downwardly, causing a proportionate increase in pressure within chamber 69. Thereafter, by virtue of the bleed valve 78, the pressure in chamber 69 will continue to increase until the pressure within chamber 70 is restored to the normal value. Pressures established within chamber 69 are transmitted to bellows 38 through pipe 37, and are effective for controlling the operation of the piston 39 and accordingly of the carriage 7 as explained with reference to Fig. 4.

The distinction between the operation of the pilot mechanism shown in Fig. 3 and that shown in Fig. 2 resides in the fact that the mechanism shown in Fig. 3 not only operates to maintain the speed of the carriage 7 at that desired, but upon departure therefrom will increase or decrease the speed thereof from that desired to compensate for the amount lost while the speed thereof was other than that desired. This speed compensation is accomplished by the differential pressures created in the chambers 69 and 70 and the attendant movement of member 76 that is transmitted to the bellows 38 through pipe 37 which, as before described controls the rate of flow of fluid to the piston 39. In this manner, notwithstanding momentary departures in speed of the carriage 7 from that desired, a uniform number of threads per unit length will be cut on the work piece 14. In the embodiment of my invention shown in Fig. 2 where the speed of the carriage 7 will be maintained at that desired, momentary departures in speed from that desired will not be compensated for, so that slight variations in the number of threads per unit of length of the work piece 14 may occur. Under ordinary circumstances such minor variations are immaterial, however, in exceptional cases I may find it preferable to employ the pilot mechanism shown in Fig. 3 rather than that shown in Fig. 2.

In Figs. 5 and 6 I illustrate a further embodiment of my invention employing a modified form of pilot mechanism. In Fig. 5 I show the lathe 1 in elevation and mounted on the carriage 7 a stationary baffle 80. Also carried by the carriage 7 in suitable ways 81 is a slide 82 on which is mounted a post 83 carrying a nozzle 84. The slide 82 is urged toward the baffle 80 by tension springs 85.

The nozzle 84 is supplied with compressed air from any suitable source through an orifice 86 and a pipe 87. So long as the nozzle 84 moves at a rate of speed corresponding to that of the carriage 7 the arrangement is such that normal pressure will exist within pipe 87. If however the nozzle 84 varies in speed from that of the carriage 7 and approaches or recedes from the baffle 80, a corresponding change in pressure will occur within the pipe 87. The pressure in pipe 87 is transmitted to the bellows 38 as shown in Fig. 4, and operates to control the rate of operation of the carriage 7 as heretofore described.

The nozzle 84 moves at a rate of speed in desired proportionality to the rate of speed of the drive shaft 24 rotating the work piece 14. As shown, the drive shaft 24 is connected to a sprocket 88 through suitable change and spur gears diagrammatically illustrated at 89. Meshing with the sprocket 88 is a suitable perforated tape 90 connected to the slide 82. As the sprocket 88 rotates, the tape 90 permits the slide 82 to advance at a rate of speed proportional to the rate of rotation of the drive shaft 24. If this rate of advance corresponds to the rate of movement of the carriage 7 then normal distance will be maintained between the baffle 80 and nozzle 84. However, if a change in the rate of movement of the carriage 7 occurs, then by virtue of the springs 85 the nozzle 84 will approach toward or recede from the baffle 80, causing a corresponding change in pressure within pipe 87 which will cause, through servomotor 12, a change or restoration in the rate of speed of the carriage 7 to that desired.

While in accordance with the patent statutes I have described certain embodiments of my invention, it is evident that such embodiments may be modified in many ways without departing from the spirit and scope of the invention. Such embodiments of my invention as I have chosen to describe should therefore be taken as merely illustrative and not as limiting.

What I claim as new, and desire to secure by Letters Patent of the United States, is:

1. In combination with a machine tool having means for rotating a work piece and a carriage movable relative to the work piece, means comprising an externally threaded member rotated in accordance with the speed of rotation of the work piece, means comprising an internally threaded member meshing with said externally threaded member rotated in accordance with the rate of movement of the carriage relative to the work piece, and means including a fluid jet discharging to atmosphere under the joint control of said last two named means for controlling the rate of movement of said carriage.

2. In combination with a machine tool having means for relatively moving a tool and work piece in two directions, mechanical differential means positioned in accordance with the difference in relative speeds in the two directions, and means including a fluid jet discharging to atmosphere under the control of said differential means for controlling the speed in one direction.

3. In combination with a lathe having a rotatable live center and a movable carriage, a nozzle having a port through which compressed air is continuously discharged to atmosphere, a baffle for said nozzle, the relative approach and recession of said nozzle and baffle governing the pressure of the compressed air in the nozzle, means for relatively moving said nozzle and baffle in accordance with changes in the amount of movement of said carriage per revolution of the live center, and means responsive to the pressure in said nozzle for governing the rate of movement of said carriage.

4. In combination with a lathe having a rotatable live center and a movable carriage, a hydraulic motor for moving said carriage, a control couple movable with said carriage, said control couple comprising a stationary baffle and a movable fluid nozzle discharging at a constant rate normally positioned in fixed relation to said baffle, the position of said fluid nozzle with relation to the stationary baffle varying in accordance with changes in the movement of said carriage per revolution of the live center, and means responsive to changes in rate of discharge of the fluid nozzle for governing the rate of movement of said hydraulic motor.

5. In combination with a machine tool having means for rotating a work piece and a carriage movable relative to the work piece, means positioned in accordance with the speed of rotation of the work piece, means positioned in accordance with the rate of movement of the carriage relative to the work piece, and means including a fluid jet discharging to atmosphere under the joint control of said last two named means for controlling the rate of movement of said carriage.

6. In combination with a machine tool having means for rotating a work piece and having a carriage movable relative to the work piece, a fluid bleed valve arranged to discharge fluid to the atmosphere, means sensitive to the relation between speed of rotation of said work piece and speed of carriage movement to vary the rate of fluid discharge from said bleed valve upon departure of said relation from a desired relation, said fluid bleed valve and said sensitive means being so constructed and arranged that the pressure of the fluid behind the valve varied with the rate of such discharge, and means for moving the carriage responsive to the fluid pressure behind the valve.

CLARENCE JOHNSON.